No. 6,246.  
J. SHAW, Jr.  
SPECTACLE FRAME.  
PATENTED APR. 3, 1849.
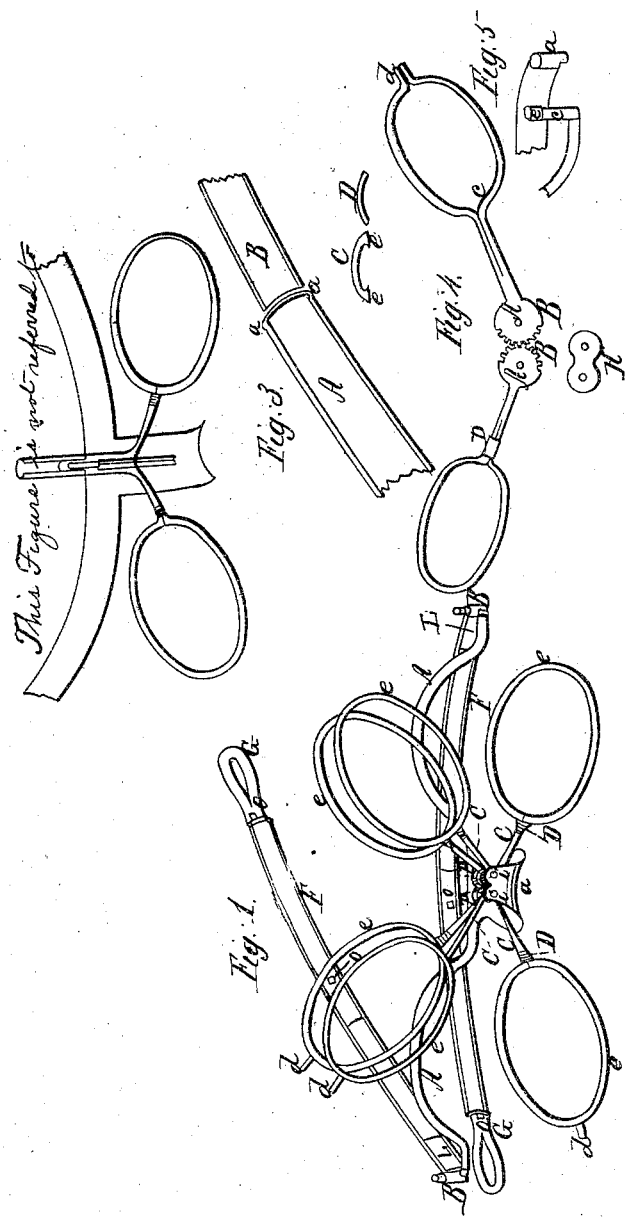

UNITED STATES PATENT OFFICE.

JACOB SHAW, JR., OF HINKLEY, OHIO.

SPECTACLE-FRAME.

Specification of Letters Patent No. 6,246, dated April 3, 1849.

*To all whom it may concern:*

Be it known that I, JACOB SHAW, Jr., of Hinkley, in the county of Medina and State of Ohio, have invented certain new and useful Improvements in Spectacles, the nature of which consists in constructing a frame (which, because of its performing the office of confining the apparatus to the head of the wearer by pressing its sides or clutching it, I have denominated a clutch-frame) and of combining one pair or any desired number of pairs of lens-frames and lenses or glasses therewith in such a manner that if only one pair is so combined (the clutch frame being applied to the head in the usual manner of applying spectacles) they may be placed before the eyes and removed at pleasure and if two or more pairs are so combined either pair or all of them may be so placed and removed; in either case the clutch-frame will remain in the same position during the operation, and in whatever direction a lens may be moved, its mate or the other member of the pair will be moved simultaneously, and each will at all times, whether in motion or at rest, be in a position corresponding with the other; if three pairs of lenses be combined with the clutch-frame in the same manner, the lenses of each pair being more or less concave or convex than those of either of the other pairs, by placing them before the eyes and removing them in the several ways in which they may be so placed and removed, the focal point or point of vision will be varied to seven different distances, and consequently they will answer the purpose of seven pairs, and if only two pairs are so combined they will answer the purpose of three pairs of common spectacles; and I do hereby declare that the foregoing and following contain a full, clear, and exact description of the construction and manner of using my improved spectacles, reference being had to the annexed drawings making a part of this specification, in which—

Figure 1 represents three pairs of glasses or lenses combined with a clutch frame in manner as above intimated A A Fig. 1 representing the principal members of the clutch frame, which; on that account I call the clutch bar, it is made of a semi-elliptical wire or rod, three portions of which are nearly in a line, while parts at each end are bent and stand nearly perpendicular to the parts in line, being made round, they form pivots, or hooks on which the clutch arms are placed and may be turned to a limited extent as represented at B B Fig. 1, the residue of the clutch bar is bent somewhat in the form of the arch of the eye brows but, by adapting the other parts of the apparatus thereto may be made of any other desired form.

F F and G G Fig. 1, represent parts of the apparatus, which being parts of the clutch frame I call clutch arms, each of which is made of two parts called the slider socket and slider. The slider socket F F is made of a plate of metal of nearly equal thickness and width from one end to the other of proper length, width and thickness, having its edges bent up longitudinally toward each other, giving it the form of a segment of a circle, and ellipsis, any portion of a square, or any other desired form that will allow of having its sides or edges again bent or turned so as to form a lip projecting inwardly on each of its sides as represented in a transverse section at *e e* Fig. 3, thus forming a longitudinal cavity of sufficient latitude to allow a slider of proper dimensions to slide easily therein, with its edges beneath the projecting lips; and likewise having one end bent inward nearly at right angles and a hole cut through that part which is thus bent of the same form as a transverse section of a slider and the inner surface of the cavity. On the other end an eye is formed, the end of the plate being reduced to a width equal to the distance between the lips on the inner surface of the cavity, it is then bent around a rod equal in diameter to the hook on the ends of the clutch bar, when the reduced part is pressed into the cavity, the edges being below the lips, where it is soldered or otherwise firmly attached as represented at L L Fig. 1. A notch is cut into the side of each eye, so that, when the hooks on the ends of the clutch bar are placed in the eyes, one side of each eye will be nearly in a line with one side of the clutch bar as represented at B B Fig. 1, the notches being formed in such a manner that the part or edge which limits the extent of each, on one side, will, when the clutch arms are opened, drop or strike into small notches in the outside of the clutch bar and prevent their further motion in that direction, see B B Fig. 1.

G G Fig. 1, represent the sliders; the ends projecting beyond the slider sockets, the remaining parts, being constructed in a form to correspond therewith, cover a part of the inner surface of the cavity in the slider sockets F F Fig. 1. An enlarged section of a slider socket is represented at A Fig. 3, and a transverse section at C Fig. 3. An enlarged section of a slider is represented at B Fig. 3 and a transverse section at D Fig. 3.

*a*, Fig. 5 represents the eye and notch therein on the end of the slider socket of the clutch arm, *c* Fig. 5 a section of the clutch bar, showing the notch near its end, and the hook on its end, and *e* Fig. 5 a small ring or ferrule on the hook near its end used for the purpose of securing the clutch arm in its place seen also at B B Fig. 1.

*o o o o* Fig. 1 represent small pieces of metal united with the inner surface of the sliders to prevent them from being withdrawn from, or driven too far into the slider socket. Clutch arms for spectacles made on the principle of those above described will, in consequence of their peculiar construction resist a much greater force acting laterally against them, than if made of the same amount of material in any known solid form. They may also be made more delicate, less cumbersome, and if made of gold or silver, less expensive than, if constructed with a slider combined therewith, in any other manner of which I have any knowledge.

*a* Fig. 1, represents a part of the apparatus which I deem proper to call a saddle, it is made by cutting a plate of metal into the required form, pressing it into proper shape to rest on the nose without inconvenience to the wearer by means of dies so constructed as to produce that effect, and at the same time bring the two ends so near to each other, and in such relative position by bending the plate, that the desired number of connecting arms, or sectors, may be placed between the parts of the plate constituting the parallel sides of the saddle. Through each of its sides a hole is made, and in the hole in the backside a spiral thread or screw is cut. The saddle is soldered or otherwise attached to the clutch bar near its middle as represented in Fig. 1.

C C C C Fig. 1 represent parts of the apparatus which, because they serve to connect the lens frames with the clutch frame I shall call connecting arms, one end of each of which terminates in a small toothed wheel or sector as represented at B B Fig. 4 and P P Fig. 1. Each wheel, or sector, having a suitable number of gear teeth in its arc to allow sufficient latitude, when in connection with the rest of the apparatus for the motion of the lenses, which are combined with the ends of the connecting arms opposite the sectors. A hole is made through each sector as represented at A A Fig. 4, through which the screws *i i* Fig. 1, after passing through the holes in the front part of the saddle, pass into holes prepared for their reception in the back part thereof, thereby confining the parts in such a manner that the teeth of each pair of sectors interlock with each other, so that whenever a lens or glass is moved its mate will be moved simultaneously thereby, with an equal motion. Rivets may be used as a substitute for the screws *i i* if desired.

A separating plate represented at H Fig. 4 is placed between the different pairs of sectors to prevent them from interfering with each other, the screws *i i* after passing through the front part of the saddle, pass through a pair of sectors, then through a separating plate, (holes being made through each of them for that purpose) then through another pair of sectors, then through another separating plate, and then through the third pair of sectors into the back part of the saddle. See *a* Fig. 1.

*e e e e e e* Fig. 1, represent the bands which surround the lenses, each of which is made of a rod longitudinally concave on one side, and convex on the other, and equal in length to the circumference of the lens and twice the length of the connecting arm, each is bent in form to surround a glass or lens, the parts which project beyond it being soldered one on one side of a connecting arm throughout its entire length, and the other on the other side throughout such part of its length as will allow the band to be opened sufficiently to admit of the insertion and removal of glasses or lenses. The connecting arms from the sectors to the lenses are made in form to correspond with the inner surface of the lens bands, and at their point of contact with the lenses, they are bent in form to correspond with the edges of the lenses, extending partly around them, being soldered to the inner surface of the bands as represented at *c* Fig. 4. On each connecting arm and surrounding the parts of the band which inclose it, is a small ring or ferrule represented at D D Fig. 1, which may be moved in either direction thereon, and which, when placed as near the glass or lens as may be, prevents the band from spreading or opening, and confines the glass in its place, and when moved to the other end, allows of the insertion and removal of lenses or glasses. *d d d* Fig. 1 represent small teeth or spurs projecting from the outward surface of the bands by which the lenses may be moved, by pressing against them with the end of the finger.

To use the spectacles above described, unfold the clutch arms, draw out the sliders and apply the apparatus to the head in the usual manner of applying spectacles, the saddle resting on the bridge of the nose. If it is wished to use the pair of glasses nearest the eyes, (all being above them) apply the thumb of the right hand to the under side of the clutch bar near its end, and the forefinger of the same hand to the teeth or spurs *d, d, d*, or if they are not attached, (as they are not deemed essential) to a point near where they are represented, and press therewith downward until all the glasses are before the eyes, then shift the finger to the top of the clutch bar and the thumb to the underside of the two outside lenses before the right eye, and therewith press upward against them until they are sufficiently removed, and proceed in a similar manner when the other pairs are to be used. To render them conveniently portable push the sliders into the slider sockets, fold the clutch arms upon the clutch bar, and place the glasses in such position that the apparatus will occupy the least space and they may be placed in any proper receptacle prepared for that purpose.

I do not claim the invention of spectacles as they have long been known and used; but Having herein fully described the construction and manner of using my improved spectacles, what I claim therein as new, and desire to secure by Letters Patent, is—

1. Combining either one pair, or any desired number of pairs of glasses, or lenses in one frame, in manner and for the purposes substantially as herein set forth and described, so that if a glass or lens be moved, its mate or the other member of the pair will, by means of the interlocking of the teeth of the small wheels, sectors, or gearing, or its equivalent, have an equal and simultaneous motion, and each member of each pair will at all times, be in a position corresponding with its mate; and this I claim irrespective of the manner of uniting the bands which surround the lenses with the connecting arms, or the means of combining the clutch bar with the clutch arms; not intending by this claim to limit myself to any particular form number of parts or material, but to vary them as I may deem expedient, while I attain the same ends by means substantially the same.

2. I also claim that part of the apparatus which I have named the clutch arm, composed of a slider socket and slider constructed and combined with each other in manner, and for the purposes, substantially as herein set forth and described, whether such clutch arms are used in combination with the other parts of the spectacles herein described, or with parts of spectacles of any other description, and this I claim irrespective of the eye formed on the end of the clutch arm or the manner or means by which they may be combined with spectacles; not intending to limit myself by this claim to any particular form herein named, or material, but to vary them as I may deem expedient while I attain the same ends by means substantially the same.

JACOB SHAW, Jr.

Witnesses:
A. M. HUMPHREY,
VALINA H. HUMPHREY.